(12) United States Patent
Billow et al.

(10) Patent No.: US 7,715,043 B2
(45) Date of Patent: May 11, 2010

(54) MULTILEVEL PRINT MASKING METHOD

(75) Inventors: Steven A. Billow, Pittsford, NY (US);
Douglas W. Couwenhoven, Fairport, NY (US); Richard C. Reem, Hilton, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 1113 days.

(21) Appl. No.: 11/362,346

(22) Filed: Feb. 24, 2006

(65) Prior Publication Data

US 2007/0201054 A1 Aug. 30, 2007
US 2008/0309952 A9 Dec. 18, 2008

(51) Int. Cl.
*G06K 15/10* (2006.01)
*H04N 1/40* (2006.01)

(52) U.S. Cl. ...................................... 358/1.8; 358/3.01

(58) Field of Classification Search .................. 358/1.1, 358/1.8, 1.9, 1.11, 1.12, 1.13, 1.14, 1.15, 358/1.16, 1.17, 1.18, 3.01; 347/5, 9, 15, 347/19, 41, 43, 47
See application file for complete search history.

(56) References Cited

U.S. PATENT DOCUMENTS 4,746,935 A 5/1988 Allen
4,967,203 A 10/1990 Doan et al.
5,416,612 A 5/1995 Ingraham et al.
5,675,365 A 10/1997 Becerra et al.
5,754,193 A 5/1998 Elhatem
5,790,150 A 8/1998 Lidke et al.
5,923,349 A 7/1999 Meyer
5,992,962 A 11/1999 Yen et al.
6,206,502 B1 3/2001 Kato et al.
6,238,037 B1 5/2001 Overall et al.
6,454,389 B1 9/2002 Couwenhoven et al.
2006/0146090 A1* 7/2006 Fellingham et al. ........... 347/41

FOREIGN PATENT DOCUMENTS

EP 0 998 117 A2 9/1999
EP 0 999 516 A2 9/1999
EP 0 998 126 10/1999

* cited by examiner

*Primary Examiner*—Thierry L Pham
(74) *Attorney, Agent, or Firm*—Mark G. Bocchetti

(57) ABSTRACT

A method of computing swath data in response to a digital image having a plurality of rows and columns of pixels, each pixel having a multitone code value, the swath data suitable for commanding an inkjet printer containing at least one printhead having plurality of nozzles, wherein the inkjet printer is capable of ejecting ink drops in response to the swath data.

22 Claims, 8 Drawing Sheets

| | 0 | 1 | 2 | 3 | 4 | 5 | 6 | 7 |
|---|---|---|---|---|---|---|---|---|
| 7 | 1 | 0 | 1 | 0 | 0 | 1 | 0 | 1 |
| 6 | 0 | 1 | 0 | 1 | 1 | 0 | 1 | 0 |
| 5 | 1 | 0 | 1 | 0 | 0 | 1 | 0 | 1 |
| 4 | 0 | 1 | 0 | 1 | 1 | 0 | 1 | 0 |
| 3 | 1 | 0 | 1 | 0 | 0 | 1 | 0 | 1 |
| 2 | 0 | 1 | 0 | 1 | 1 | 0 | 1 | 0 |
| 1 | 1 | 0 | 1 | 0 | 0 | 1 | 0 | 1 |
| 0 | 0 | 1 | 0 | 1 | 1 | 0 | 1 | 0 |

| | 0 | 1 | 2 | 3 | 4 | 5 | 6 | 7 |
|---|---|---|---|---|---|---|---|---|
| 7 | 1 | 0 | 1 | 1 | 0 | 1 | 0 | 0 |
| 6 | 0 | 1 | 0 | 1 | 1 | 0 | 1 | 0 |
| 5 | 0 | 0 | 1 | 0 | 1 | 1 | 0 | 1 |
| 4 | 0 | 1 | 0 | 1 | 1 | 0 | 1 | 0 |
| 3 | 1 | 0 | 1 | 1 | 0 | 1 | 0 | 0 |
| 2 | 0 | 1 | 0 | 1 | 1 | 0 | 1 | 0 |
| 1 | 0 | 0 | 1 | 0 | 1 | 1 | 0 | 1 |
| 0 | 0 | 1 | 0 | 1 | 1 | 0 | 1 | 0 |

PIXEL COLUMN INDEX, $x_m$

PIXEL ROW INDEX, $y_m$

FIG. 7

MULTILEVEL PRINT MASKING METHOD

FIELD OF THE INVENTION

This invention pertains to the field of inkjet printing systems, and more particularly to a method for multilevel print masking for inkjet printing.

BACKGROUND OF THE INVENTION

A typical inkjet printer reproduces an image by ejecting small drops of ink from a printhead containing nozzles, where the ink drops land on a receiver medium (typically paper) to form ink dots. A typical inkjet printer reproduces a color image by using a set of color inks, usually cyan, magenta, yellow, and black. It is well known in the field of inkjet printing that if ink drops placed at neighboring locations on the page are printed at the same time, then the ink drops tend to flow together on the surface of the page before they soak into the page. This can give the reproduced image an undesirable grainy or noisy appearance often referred to as "coalescence". It is known that the amount of coalescence present in the printed image is related to the amount of time that elapses between printing adjacent dots. As the time delay between printing adjacent dots increases, the amount of coalescence decreases, thereby improving the image quality. There are many techniques present in the prior art that describe methods of increasing the time delay between printing adjacent dots using methods referred to as "interlacing", "print masking", or "multipass printing". There are also techniques present in the prior art for reducing one-dimensional periodic artifacts referred to as "bands" or "banding." This is achieved by advancing the paper by an increment less than the printhead width, so that successive passes or "swaths" of the printhead overlap. The techniques of print masking and swath overlapping are typically combined. See, for example, U.S. Pat. Nos. 4,967,203 and 5,992,962. The term "print masking" generically means printing subsets of the image pixels in multiple partially overlapping passes of the printhead relative to a receiver medium.

Another attribute of modem inkjet printers is that they typically possess the ability to vary (over some range) the amount of each ink that is deposited at a given location on the page. Inkjet printers with this capability are referred to as "multitone" inkjet printers because they can produce multiple density tones at each location on the page. Some multitone inkjet printers achieve this by varying the volume of the ink drop produced by the nozzle by changing the electrical signals sent to the nozzle or by varying the diameter of the nozzle. See for example U.S. Pat. No. 4,746,935. Other multitone inkjet printers produce a variable number of smaller, fixed size droplets that are ejected by the nozzle, all of which are intended to merge together and land at the same location on the page. See for example U.S. Pat. No. 5,416,612. These techniques allow the printer to vary the size or optical density of a given ink dot, which produces a range of density levels at each location, thereby improving the image quality.

Another common way for a multitone inkjet printer to achieve multiple density levels is to print a small amount of ink at a given location on several different passes of the printhead over that location. This results in the ability to produce a greater number of density levels than the nozzle can fundamentally eject, due to the build up of ink at the given location over several passes. See, for example, U.S. Pat. No. 5,923,349.

In U.S. Pat. No. 5,790,150, Lidke et al. disclose a method where multiple passes are made over the page before the page is advanced. In each pass, the pattern of dots in the data swath is constructed with sufficient spacing between the dots such that the printhead can be scanned across the page at a velocity that is higher than the firing frequency limit of the nozzles.

In U.S. Pat. No. 6,206,502, Kato et al. disclose a print masking method in which nozzles at the ends of the printhead print with lower duty than nozzles near the center of the printhead, thereby reducing the possibility of banding artifacts occurring at the boundaries between successive printed swaths.

In U.S. Pat. No. 6,238,037, Overall et al. disclose a print masking method for a multilevel inkjet printer in which the print mask contains a set of threshold values. A dot will print at a given location on a given pass if the multitone code value for that pixel is greater than the threshold for that pass. This method requires that if a dot gets printed at a given pixel on pass N, then it also must receive dots on passes 0 through N-1.

In U.S. Pat. No. 6,454,389, Couwenhoven et al. disclose a print masking method suitable for multilevel inkjet printers that can produce multiple sized ink drops.

In all of the above mentioned inkjet printers, the designer of the printer is faced with the task of splitting the image data into multiple memory buffers corresponding to the multiple passes of the printhead. It is believed that the prior art methods are constrained so that the dot patterns printed corresponding to one multitone level are highly correlated with the dot patterns printed corresponding to another multitone level. This restriction can lead to undesirable print artifacts or excessive or unbalanced use of some nozzles. Therefore there is a need for improvement over the prior art in the area of multipass printing to support multitone ink jet printers which eject multiple drops at a given location on several different passes.

SUMMARY OF THE INVENTION

It is an object of the present invention to provide for multipass inkjet printing which produces high quality images. This object is achieved by computing swath data in response to a digital image having a plurality of rows and columns of pixels, each pixel having a multitone code value, the swath data suitable for commanding an inkjet printer containing at least one printhead having a plurality of nozzles, wherein the inkjet printer is capable of ejecting ink drops in response to the swath data, comprising the steps of:

a) providing a print mask having a plurality of mask planes, each mask plane corresponding to a multitone code value and wherein each mask plane contains a plurailty of mask elements, each mask element having at least a first value corresponding to no ejection of an ink drop, and a second value corresponding to an ejection of an ink drop;

b) selecting a mask plane in response to the multitone code value;

c) selecting a mask element from the selected mask plane in response to a pixel row index and a pixel column index, and;

d) computing a swath data value in response to the value of the selected mask element.

Advantages

It is an advantage of the present invention that print masking is achieved in order to minimize coalescence.

It is another advantage of the present invention that banding artifacts may be reduced by swath overlapping.

Yet another advantage of the present invention that dot patterns printed in response to different multitone levels can be independent from each other.

Yet another advantage of the present invention that undesirable banding and gloss artifacts can simultaneously be minimized.

BRIEF DESCRIPTION OF THE DRAWINGS

FIG. 3 is a diagram showing the details of a mask plane;

FIG. 5 is a diagram showing the details of a mask plane;

FIG. 7 is a diagram showing the details of a mask plane;

DETAILED DESCRIPTION OF THE INVENTION

Figure 1:
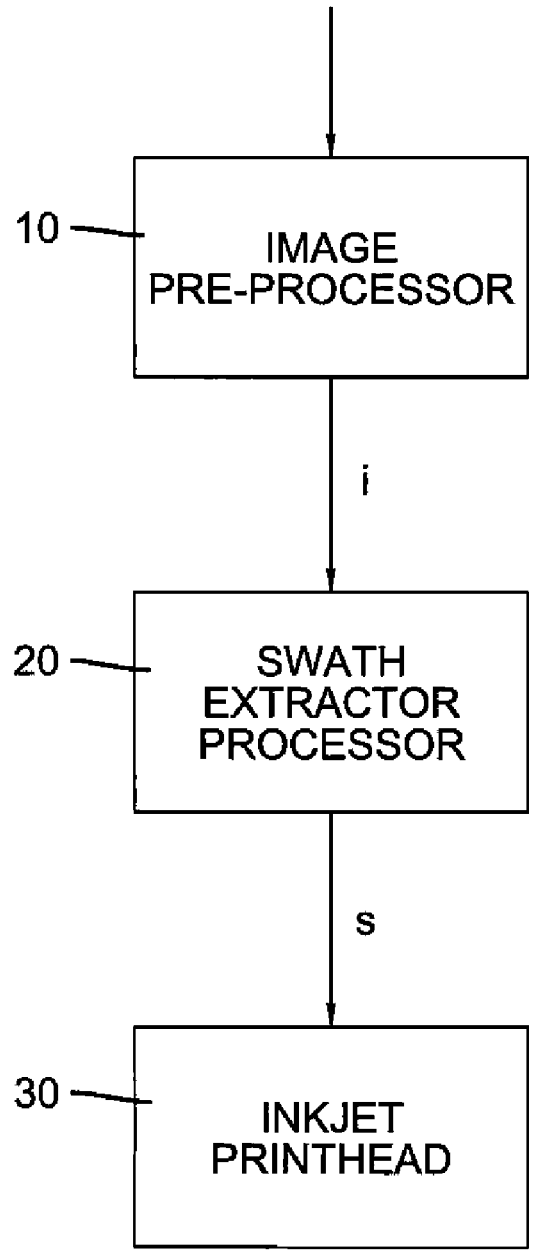
FIG. 1 is a flow diagram showing an typical inkjet printer system.

This invention describes a method of printing high quality digital images on a receiver medium using an inkjet printer employing multiple print passes. Turning to FIG. 1, a typical inkjet printer system is shown in which an image preprocessor 10 receives a digital image from a host computer (not shown), and performs standard image processing functions such as sharpening, resizing, color conversion, and multitoning to produce a multitoned image signal i. The multitoned image signal i is composed of a set of color data planes hereinafter referred to as color channels. Each color channel corresponds to a particular colorant in the printer, such as the cyan, magenta, yellow, or black inks used in a typical inkjet printer. The data comprising each color channel is a two dimensional array (width=w, height=h) of individual picture elements, or "pixels". The pixel's location in the image is specified by its (x,y) coordinates in the array, where $0 \leq x \leq w-1$ and $0 \leq y \leq h-1$. The x location of the pixel is also referred to as the pixel column number, and the y location of the pixel is referred to as the pixel row number. The term "signal" is used to generically refer to the array of pixels having digital code values that form the image.

A swath data generator 20 then receives the multitoned image signal i and generates a swath data signal s, which controls the volume of ink printed by an inkjet printhead (or printheads) 30. The process of print masking is contained within the swath data generator 20, and will be described in detail hereinafter. Prior to multitoning, each pixel contains a numeric code value (typically on the range {0,255}) for each color channel that indicates the amount of the corresponding colorant to be placed at the given pixel's location in the image. After multitoning (at the output of the image preprocessor 10), the image is represented by multitone code values, where the range of pixel code values has been reduced to match the number of density levels that the inkjet printer can produce. For binary inkjet printers, the possible multitone code values will be either 0 or 1, indicating whether to print 0 or 1 drops of ink. Multitone inkjet printers will accept multitone code values on the range {0,N-1}, where N is the number of possible multitone code values, and is normally the number of density levels (or number of drops) that the multitone inkjet printer can produce at a given pixel.

Figure 2:
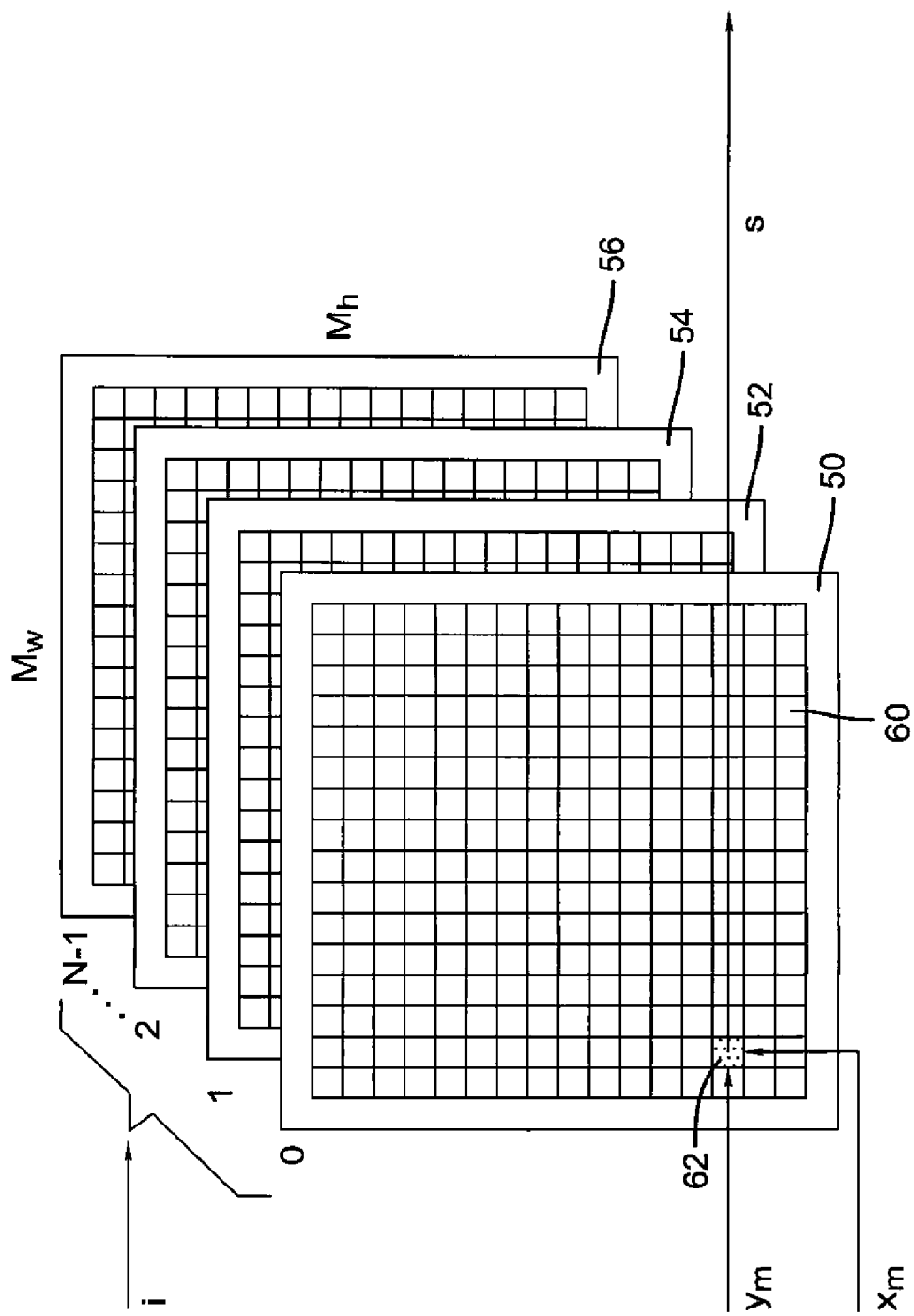
FIG. 2 is a diagram illustrating print masking according to the present invention.

Turning now to FIG. 2, the details of the swath data generator 20 are shown. A "swath" of data is defined as the dot ejection data that is required during one motion of the printhead across the page. In FIG. 2, according to a preferred embodiment, a print mask for a given color contains a set of mask planes 50, 52, 54, 56, each of which has a $M_w \times M_h$ array of individual mask elements 60. In a preferred embodiment of the present invention, the mask planes 50, 52, 54, 56 may be stored in a data file which resides on a disk storage medium in a computer which implements the swath data generator 20. Another embodiment of the present invention may have the swath data generator 20 implemented in an embedded computer within an inkjet printer, and the mask planes 50, 52, 54, 56 may be stored in programmable memory within the printer. One skilled in the art will recognize that there are many different hardware configurations for the swath data generator 20 and many different storage options for the mask planes that may be constructed, and that the present invention may be applied to any of the different configurations.

In a preferred embodiment of the present invention, the mask height $M_h$ is set equal to the number of nozzles in the printhead, although this is not a fundamental restriction, and a mask height of lesser or greater value may be used. One of the mask planes is selected for a given pixel according to the multitone code value of the multitoned image signal i, as shown in FIG. 2. A pixel column index $x_m$ and a pixel row index $y_m$ are computed according to the following equations:

$$x_m = x \% M_w \qquad \text{EQ 1}$$

$$y_m = y \% M_h \qquad \text{EQ 2}$$

where x is the pixel column number and y is the pixel row number of the current pixel being processed, $M_w$ is the mask width, $M_h$ is the mask height, and the "%" symbol indicates the mathematical modulo operator. A mask element 62 is then selected from the chosen mask plane according to:

$$s = \text{MaskPlane}(i, x_m, y_m) \qquad \text{EQ 3}$$

In a preferred embodiment, the value of the swath data signal s for the current pixel is set equal to the value of the selected mask element, as indicated by EQ 3.

Turning now to FIG. 3, details of a mask plane 70 are shown. In the mask plane 70, each of the individual mask elements 80 can be one of two values: a first value (0) indicating that no ink drop is to be ejected, and a second value (1) indicating one drop of ink is to be ejected. Thus, if the mask plane 70 corresponds to multitone code value 1, and a uniform 8×8 input image of multitone code value 1 was input to the swath data generator 20, then a dot pattern indicated by the mask elements having value "1" in the mask plane 70 would be printed in one pass of the printhead. The mask plane 70 is shown as having a width and height of 8, although one skilled in the art will recognize that the present invention will apply to a mask of any arbitrary size.

Figure 4:
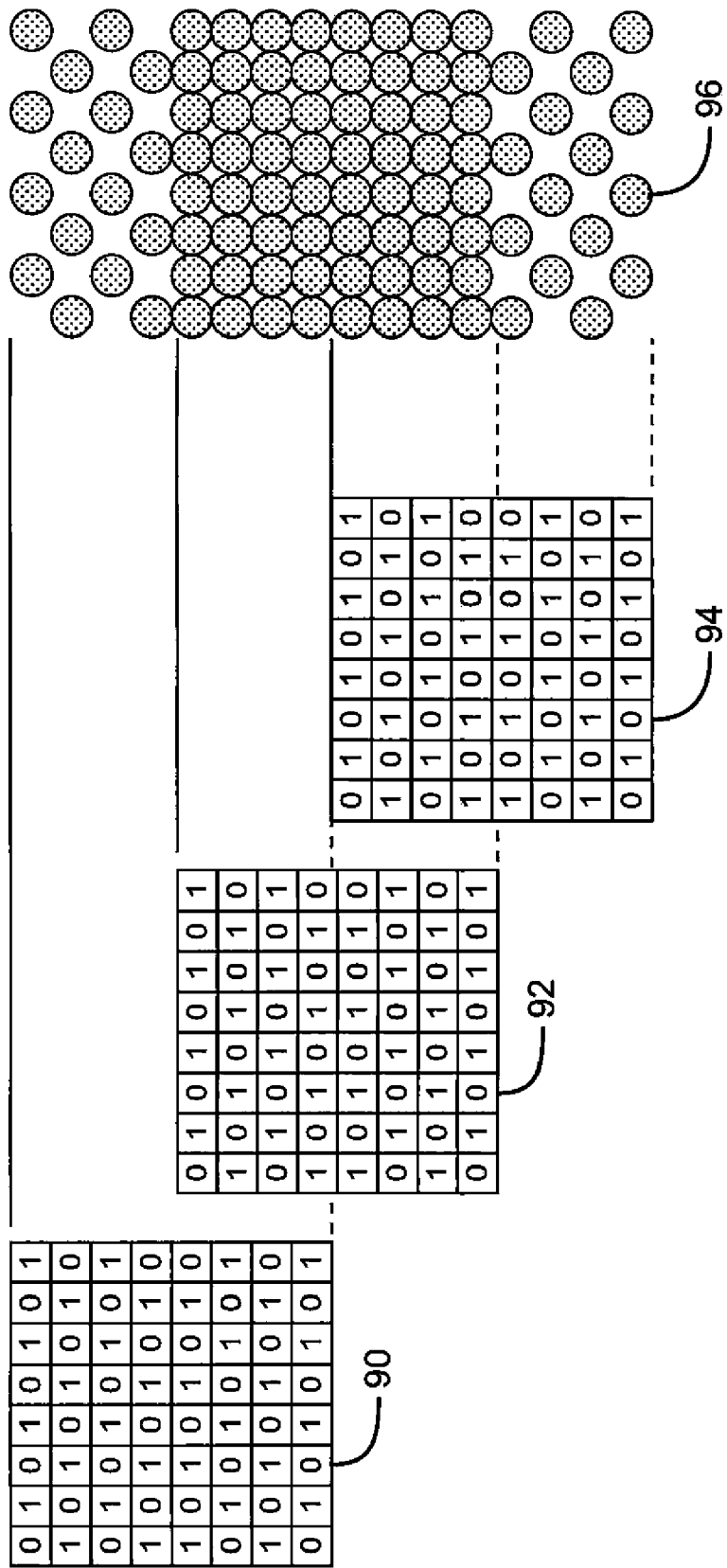
FIG. 4 is a diagram illustrating multipass printing.

Turning now to FIG. 4, the dot patterns resulting from three subsequent passes of an inkjet printhead having 8 nozzles in response to a uniform 8×8 input image of multitone code value 1 are shown. In this example, the print mask used has the mask plane 70 of FIG. 3 set to correspond to multitone code value 1, and the receiver media is advanced by four raster lines between each pass of the printhead. Since the input image has a uniform field of multitone code value 1, then mask plane 70 will be selected for every pixel in the 8×8 image, and the pattern of dots printed in each of the three succesive swaths will correspond to the pattern of 1's in the mask plane 70. As shown in FIG. 4, the resulting swath patterns 90, 92, 94 are shown offset horizontally from each other, and the resulting pattern of ink dots 96 is shown. Note that in regions where two successive print passes overlap, every pixel location has received one drop of ink, which corresponds to the desired output for the 8×8 input image of multitone code value 1. Thus, the print mask shown in the example is appropriate for use in a "two-pass" printmode, meaning that two passes of the printhead are required for the desired final dot patterns to be printed. This also means that the mask plane 70 is designed such that the top half and bottom half of the mask, when overprinted on two subsequent print swaths, will produce the desired number of ink drops at each pixel.

Figure 5:
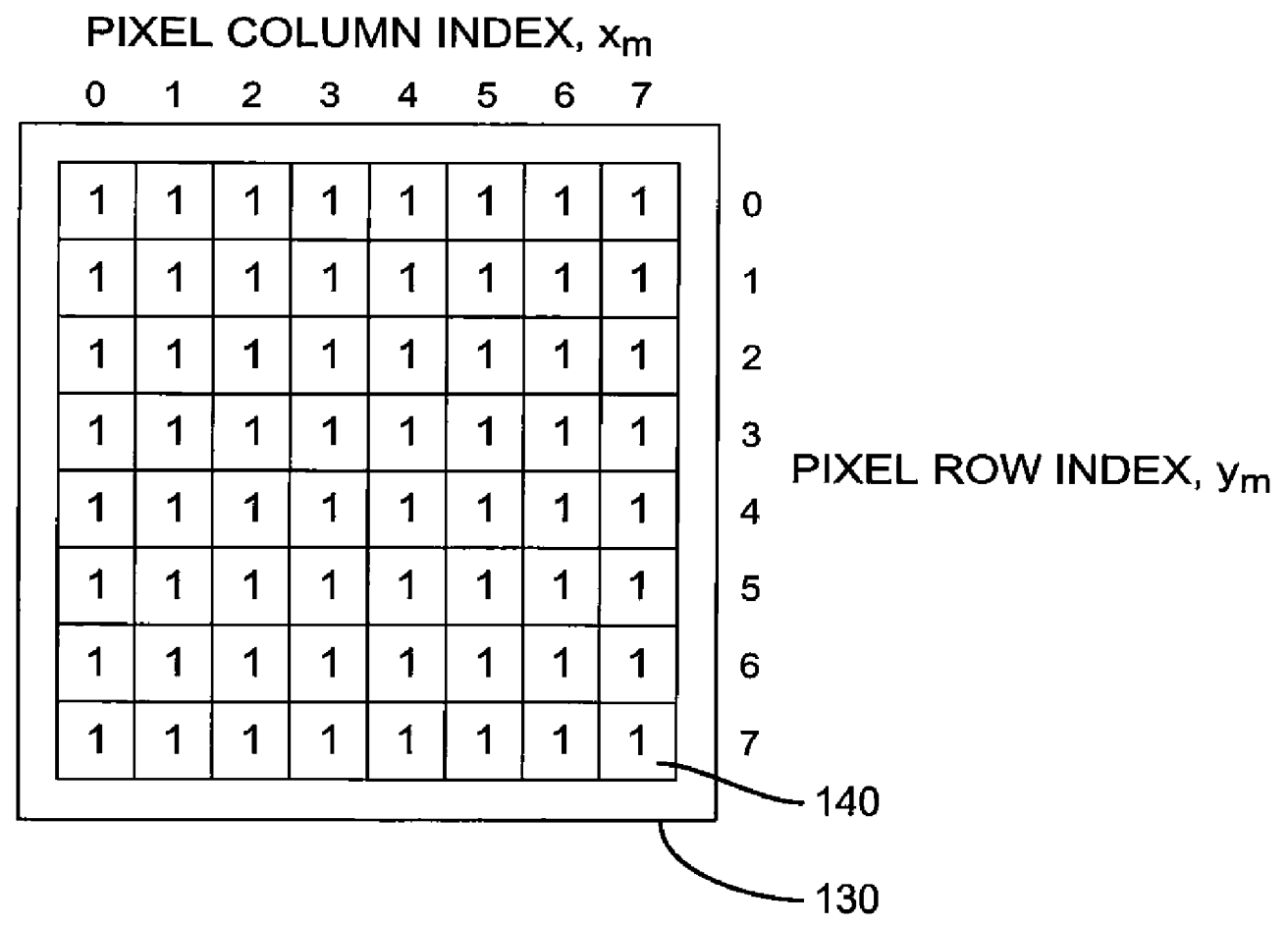
Figure 6:
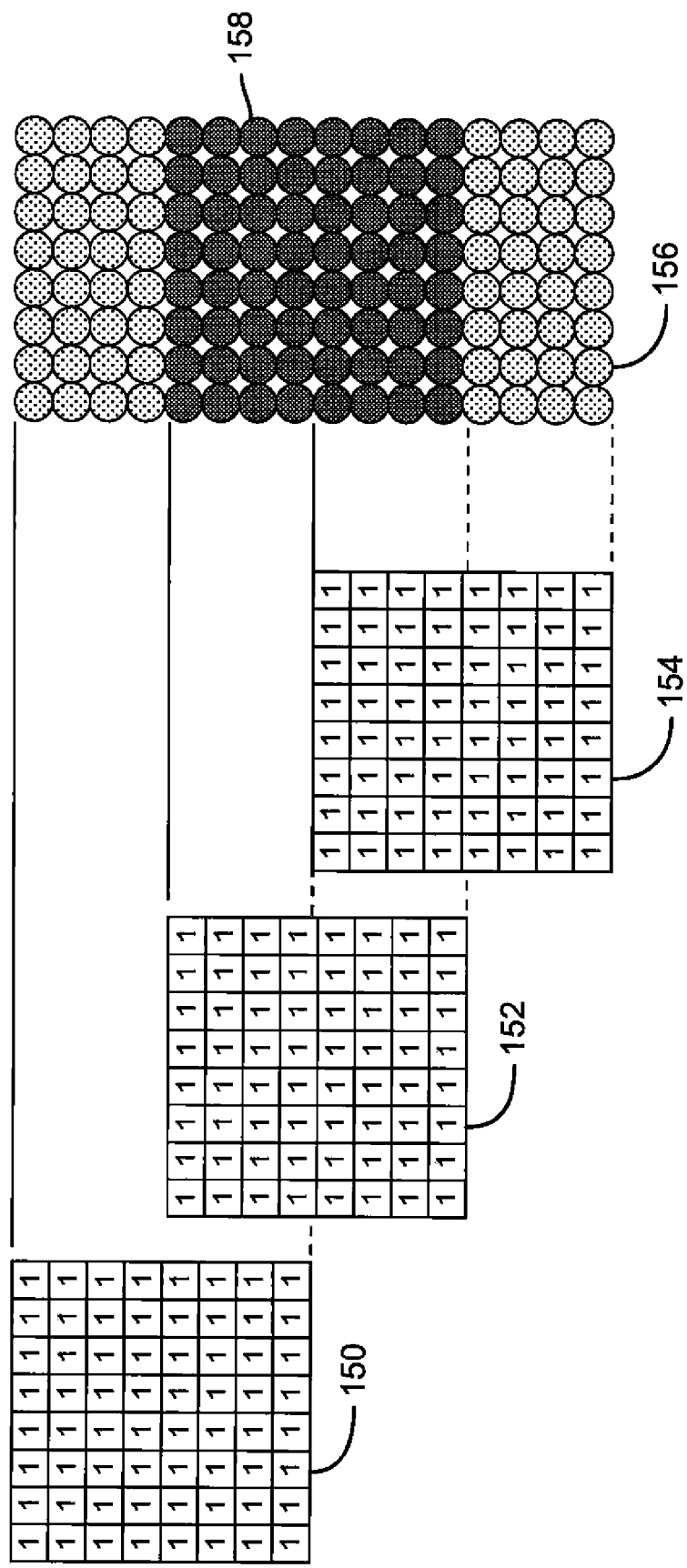
FIG. 6 is a diagram illustrating multipass printing.

Consider now the mask plane 130 of FIG. 5 having an array of mask elements 140. This (somewhat trivial) mask plane is designed for a two pass printmode to correspond to multitone code value 2, meaning that it is desired that each pixel receive two drops of ink. For example, assume that an 8×8 input image of uniform multitone code value 2 is printed using a print mask where mask plane 130 is set to correspond to multitone code value 2. FIG. 6 shows the resulting ink dots that are printed by three subsequent swaths corresponding to patterns 150, 152, 154 (again shown offset horizontally for clarity), where ink dots 156 indicate pixels that have received one drop of ink (so far), and ink dots 158 indicate pixels that have received two drops of ink. One skilled in the art will recognize that special conditions exist at the top and bottom of a page that require an extra print pass to complete the printing of all intended ink dots.

In a preferred embodiment of the present invention, a print mask is used that has separate mask planes corresponding to each multitone code value. For example, the mask plane 70 of FIG. 3 may be used for multitone code value 1, and the mask plane 130 of FIG. 5 may be used for multitone code value 2. Each of these mask planes can be designed completely independently of each other, as long as they are designed for the same number of print passes and media advance. When two mask planes are referred to as being independent, it is meant that the values of the mask elements in one mask plane do not depend on the values of the mask elements in another plane, including the mask element at the same spatial position in the printmask. Thus, there is no constraint imposed on the pattern of mask elements in a given mask plane due to any other mask plane. This aspect of the present invention is fundamental, and provides for improved image quality relative to the prior art.

Figure 8:
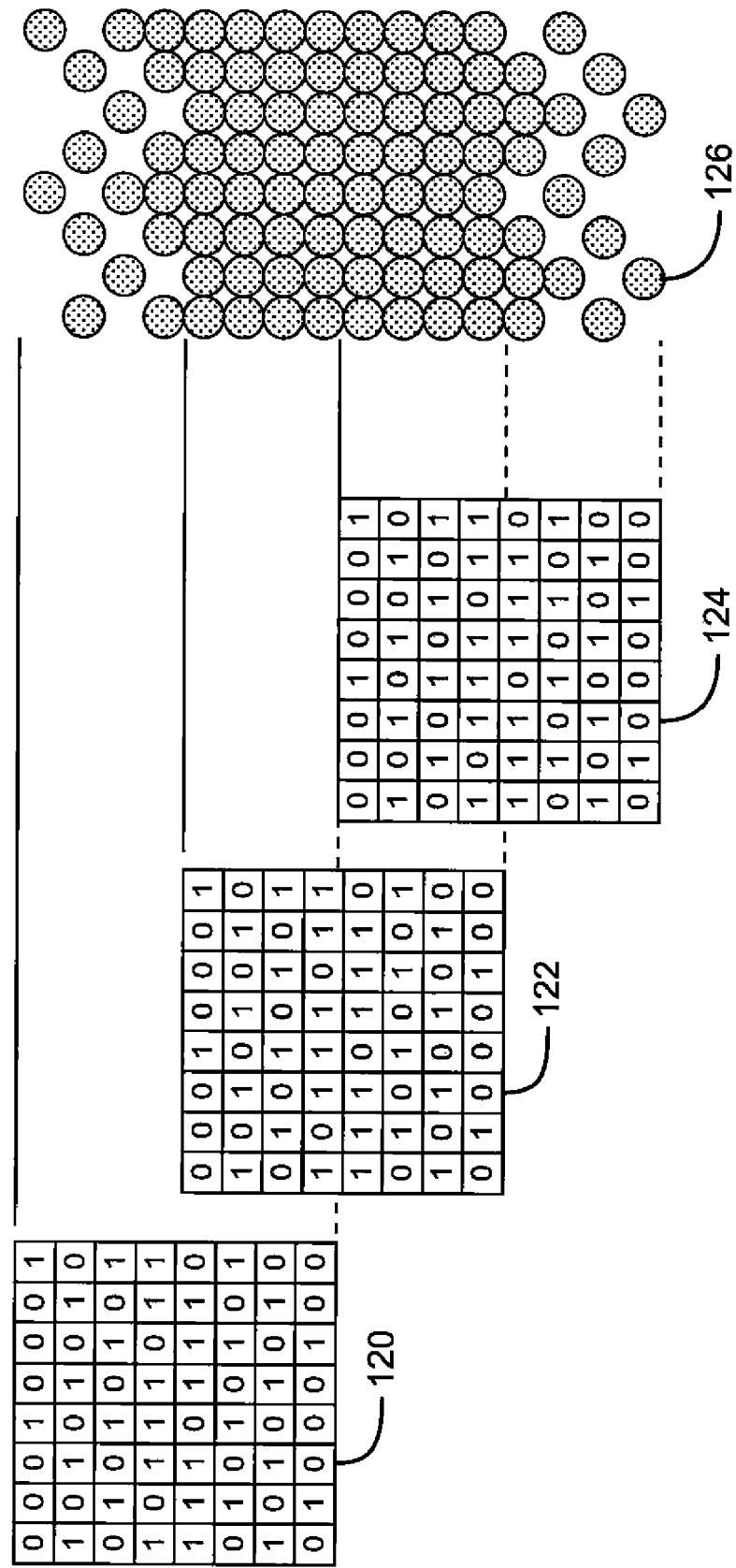
FIG. 8 is a diagram illustrating multipass printing.

Turning now to FIG. 7, another mask plane 100 is shown, having individual mask elements 110. The mask plane 100 is similar to the mask plane 70 of FIG. 3, except that each row of the mask plane will not activate the same number of dots. For example, note that row 0 of the mask plane 100 contains only two 1's, whereas row 3 contains six 1's. As mentioned earlier, a preferred embodiment of the present invention has the mask height $M_h$ equal to the number of nozzles in the printhead, which means that each mask row corresponds to one nozzle. Thus, nozzle 0 would print using mask row 0, and nozzle 3 would print using mask row 3. If a uniform 8×8 image of multitone code value 1 was used with a print mask having mask plane 100 set to correspond to multitone code value 1, then nozzle 0 would print only two out of every eight pixels, and nozzle 3 would print six out of every eight. The percentage of dots printed in the width of the mask is called the nozzle duty cycle. Thus, printing using the mask plane 100 as decribed above commands a non-uniform duty cycle, meaning that not all of the nozzles in the printhead will print with the same duty. FIG. 8 shows three succesive print swaths (again with a media advance of 4 raster lines) that print swath patterns 120, 122, 124 in response to a uniform 8×8 input image of multitone code value 1 and using a print mask having the mask plane 100 set to correspond to multitone code value 1. It can be seen from the pattern of ink dots 126 that regions that have two overlapping passes result in one ink drop at every pixel, which is the desired output corresponding to the input image.

One aspect of printing with a non-uniform duty cycle is that pixels near the boundary between successive swaths are printed predominantly with nozzles near the center of the printhead. This can be advantageous for hiding banding artifacts that commonly occur near the swath boundaries. However, when printing with pigmented inks, a non-uniform duty cycle is known to produce gloss artifacts in darker density tones. This is largely due to the interaction of the pigmented ink drops with the receiver media. However, the method of the present invention can be used advantageously to circumvent this problem. Recall that a key advantage of the present invention is that the mask planes of a print mask can be designed independently from each other, meaning that there is no constrained or implied correlation between the dot patterns printed from one multitone level to the next. Thus, a mask plane having a non-uniform duty cycle can be used for lower multitone code values (corresponding to lighter tones), and a mask plane with a substantially uniform duty cycle can be used for higher multitone code values (corresponding to darker tones). In this arrangement, the benefits of reduced banding at swath boundaries and reduced gloss artifacts are simultaneously achieved. There are also other arrangements that are possible within the scope of the invention to circumvent the gloss artifacts problem. According to another embodiment of the invention, a first print mask corresponding to a first color contains at least a first mask plane that has a non-uniform duty cycle in which the nozzles near the center of the printhead print with higher duty than nozzles near the ends of the printhead. A mask plane having a duty cycle of this type is said to have a "concave down" duty cycle. A second print mask corresponding to a second color contains at least one mask plane that has a non-uniform duty cycle that is substantially "inverted" from the duty cycle of the first mask plane used in the first print mask. In this mask plane, the nozzles at the ends of the printhead would print with higher duty than nozzles in the center of the printhead. A mask plane having a duty cycle for this type is said to have a "concave up" duty cycle. Using a concave down duty cycle for one color and a concave up duty cycle for another cycle has an advantage when printing with pigmented inks in that the roughness of the printed surface can be made substantially uniform, thereby minimizing gloss artifacts. This arrangement is especially useful for inkjet printers utilizing a clear ink, as the clear ink print mask can be constructed to have a duty cycle that is substantially inverted from the print masks used for the colored inks.

The invention has been described in detail with particular reference to certain preferred embodiments thereof, but it will be understood that variations and modifications can be effected within the spirit and scope of the invention. For example, it will be known to one skilled in the art that it is not necessary to store mask planes corresponding to multitone code value 0 and N-1. This is because multitone code value 0 typically indicates that no ink is intended to be printed, and therefore the print masking process can be skipped entirely. Alternatively, the mask plane corresponding to multitone code value 0 would have all mask elements of 0. Similarly, multitone code value N-1 typically corresponds to the printing of N-1 drops of ink at each pixel. If this mask is used in a printmode having N-1 print passes, then that means that every pixel gets an ink drop on every pass, and the mask plane corresponding to multitone code value N-1 would therefore have all mask elements of 1.

It should also be noted that it is possible within the scope of the invention to have a printmode with P passes that uses a print mask having N mask planes corresponding to an input image having N multitone levels, where P>N. For example, an 8 pass printmode may be used to print an image having 3 multitone levels. In this arrangement, the print mask will store 3 mask planes corresponding to the 3 multitone levels, and each mask plane will be designed to produce the correct number of ink drops at each pixel when printed over 8 passes.

In another embodiment of the present invention, the plurality of mask planes that compose the print mask need not all be the same size. For example, the mask plane corresponding to multitone code value 1 may have an array of mask elements that is 32×27 (width×height), and the mask plane corresponding to multitone level 2 may be 16×27. This is possible because the pixel column index is computed from the pixel column number using a modulo operator with the mask plane width. In this arrangement, it is necessary for the height of each mask plane to be the same.

It will also be known to one skilled in the art that the multitone code value does not necessarily correspond to the number of ink drops directly. For example, it is possible that multitone code values of 0,1,2,3 may correspond to 0,1,3,7 drops of ink, respectively. The method of the present invention described above will apply equally well to inkjet printers having such an arrangement.

It is also known to one skilled in the art that not all of the nozzles in a printhead are necessarily used in each printmode. For example, it is common to deactivate a few nozzles at one or both ends of the printhead in order to make the number of active nozzles integer divisible by the media advance. In such an arrangement, the method of the present invention will apply equally well by using a print mask having mask elements corresponding to the active nozzles in the printhead.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

PARTS LIST 10 image preprocessor
20 swath data generator
30 inkjet printhead
50 mask plane
52 mask plane
54 mask plane
56 mask plane
60 mask element
62 mask element
70 mask plane
80 mask element
90 swath pattern
92 swath pattern
94 swath pattern
96 ink dots
100 mask plane
110 mask element
120 swath pattern
122 swath pattern
124 swath pattern
126 ink dots
130 mask plane
140 mask element
150 swath pattern
152 swath pattern
154 swath pattern
156 ink dots
158 ink dots

The invention claimed is:

1. A method of computing swath data in response to a digital image having a plurality of rows and columns of pixels, each pixel having a multitone code value for one or more color channels, each multitone code value having a plurality of possible values corresponding to different density levels, the swath data suitable for commanding an inkjet printer containing at least one printhead having a plurality of nozzles, wherein the inkjet printer is capable of ejecting ink drops in response to the swath data, comprising the steps of:
   a) providing a print mask for a particular color channel having a plurality of mask planes, each mask plane corresponding to a different multitone code value for the particular color channel and wherein each mask plane contains a plurality of mask elements, each mask element having a mask value being one of at least a first value corresponding to no ejection of an ink drop, and a second value corresponding to an ejection of an ink drop;
   b) selecting a mask plane in response to the multitone code value;
   c) selecting a mask element from the selected mask plane in response to a pixel row index and a pixel column index, and;
   d) computing a swath data value for the particular color channel in response to the mask value of the selected mask element.

2. The method of claim 1 wherein each of the plurality of mask planes for the particular color channel is independent from each of the other of the plurality of mask planes for the particular color channel.

3. The method of claim 1 wherein the number of mask planes is equal to the number of possible multitone code values for the particular color channel.

4. The method of claim 1 wherein the inkjet printer is commanded such that N drops of ink for the particular color channel are placed at a given pixel having a corresponding multitone code value of N.

5. The method of claim 1 wherein the plurality of mask elements for each mask plane contains at least one mask element corresponding to each active nozzle for the corresponding color channel in the printhead.

6. The method of claim 1 wherein each mask plane is represented as a two dimensional array indexed along a first dimension by the pixel row index, and indexed along a second dimension by a pixel column index.

7. The method of claim 6 wherein the pixel column index is computed by taking the pixel column number and performing a modulo operation with an integer mask width $M_w$.

8. The method of claim 6 wherein the pixel row index is computed by taking the pixel row number and performing a modulo operation with an integer mask height $M_h$.

9. The method of claim 8 wherein the integer mask height $M_h$ is equal to the number of nozzles in the printhead.

10. The method of claim 1 wherein step d) includes setting the swath data value for the particular color channel equal to the value of the selected mask element.

11. The method of claim 5 wherein a set of all mask elements within a mask plane that correspond to a nozzle new one of the ends of the printhead has fewer occurrences of the second mask value than a set of all mask elements within the mask plane than correspond to a nozzle near the center of the printhead.

12. The method of claim 5 wherein at least a first mask plane corresponding to a first multitone code value has a non-uniform duty cycle profile.

13. The method of claim 12 wherein at least a second mask plane corresponding to a second multitone code value has a substantially uniform duty cycle profile.

14. The method of claim 13 wherein the second multitone code value is larger than the first multitone code value.

15. A method of computing swath data in response to a digital image having a plurality of rows and columns of pixels, each pixel having a multitone code value for one or more color channels, each multitone code value having a plurality of possible values corresponding to different density levels, the swath data suitable for commanding an inkjet printer containing at least one printhead having a plurality of nozzles, wherein the inkjet printer is capable of ejecting ink drops in response to the swath data, comprising the steps of:
   a) providing a print mask for a particular color channel containing a multidimensional array of mask elements having at least three dimensions, wherein a first dimension of the multidimensional array corresponds to a pixel row index, a second dimension corresponds to a pixel column index, and a third dimension corresponds to the multitone code value for the particular color channel;
   b) selecting a mask element from the print mask responsive to the pixel row index, the pixel column index, and the multitone code value;
   c) computing a swath data value for the particular color channel in response to the value of the selected mask element.

16. A method of claim 1 wherein an inkjet printer is a color inkjet printer in which the method is applied to at least one color channel corresponding to at least one ink color.

17. A method of claim 1 wherein an inkjet printer is a color inkjet printer in which the method is applied to at least a first color channel corresponding to a first ink and a second color channel corresponding to a second ink, and wherein at least a first mask plane of a first print mask corresponding to the first color channel has a concave up duty cycle, and at least a second mask plane of a second print mask corresponding to the second color channel has a concave down duty cycle.

18. The method of claim 17 wherein at least one of the first or second inks is a clear ink.

19. The method of claim 1 wherein the print mask has N mask planes corresponding to N multitone levels, and the inkjet printer prints the digital image using a printmode at least N-1 passes.

20. A method of computing swath data in response to a digital image having a plurality of rows and columns of pixels, each pixel having a multitone code value for one or more color channels, each multitone code value having a plurality of possible values corresponding to different density levels, the swath data suitable for commanding an inkjet printer containing at least one printhead having a plurality of nozzles, wherein the inkjet printer is capable of ejecting ink drops in response to the swath data, comprising the steps of:
   a) providing a print mask for a particular color channel having a plurality of mask planes, each mask plane corresponding to a different multitone code value for the particular color channel and wherein each mask plane contains a plurality of mask elements, each mask element having a mask value being one of at least a first value corresponding to no ejection of an ink drop, and a second value corresponding to an ejection of an ink drop;
   b) selecting a mask element from the print mask in response to a nozzle number, a pixel column, and the multitone code value for the particular color channel for selected pixel; and
   c) computing a swath data value for the particular color channel for the selected pixel in response to the value of the selected mask element.

21. A method of printing a digital image with an ink jet print head including a plurality of nozzles, the digital image having a plurality of rows and columns of pixels, each pixel of the digital image having a multitone code value for one or more color channels, each multitone code value having a plurality of possible values corresponding to different density levels, the method comprising the steps of:
   a) providing a print mask for a particular color channel having a plurality of mask planes, each mask plane corresponding to a different multitone code value for the particular color channel and wherein each mask plane contains a plurality of mask elements, each mask element having a mask value being one of at least a first value corresponding to no ejection of an ink drop, and a second value corresponding to an ejection of an ink drop;
   b) selecting a mask element for each pixel from the print mask in response to a nozzle number, a pixel column, and the multitone code value of the pixel for the particular color channel;
   c) computing a swath data value for the particular color channel for each pixel in response to the value of the selected mask element, and
   d) printing ink drops for the particular color channel with the print head in response to the swath data value computed for each pixel.

22. The method of claim 21 wherein the values of the mask elements in each of the plurality of mask planes are independent of the values of the mask elements of any others of the plurality of mask planes.

* * * * *

UNITED STATES PATENT AND TRADEMARK OFFICE
CERTIFICATE OF CORRECTION

PATENT NO. : 7,715,043 B2  Page 1 of 1
APPLICATION NO. : 11/362346
DATED : May 11, 2010
INVENTOR(S) : Billow et al.

It is certified that error appears in the above-identified patent and that said Letters Patent is hereby corrected as shown below:

| Column | Line | |
|---|---|---|
| First Page Col. 1 Item 57 (Abstract) | 5 | After "having" insert -- a --. |
| 8 | 67 | In Claim 11, delete "new" and insert -- near --, therefor. |
| 10 | 19 | In Claim 20, after "for" insert -- a --. |

Signed and Sealed this

Third Day of August, 2010

David J. Kappos
*Director of the United States Patent and Trademark Office*